US012603240B2

(12) United States Patent
Kreuzpointner et al.

(10) Patent No.: US 12,603,240 B2
(45) Date of Patent: Apr. 14, 2026

(54) ELECTRICAL SWITCHING DEVICE WITH LOCKING FUNCTION

(71) Applicant: Schaltbau GmbH, Munich (DE)

(72) Inventors: Korbinian Kreuzpointner, Oberding (DE); Andrej Ignatov, Munich (DE); Martin Geschke, Munich (DE)

(73) Assignee: Schaltbau GmbH, Munich (DE)

( * ) Notice: Subject to any disclaimer, the term of this patent is extended or adjusted under 35 U.S.C. 154(b) by 217 days.

(21) Appl. No.: 18/277,174

(22) PCT Filed: Feb. 16, 2022

(86) PCT No.: PCT/EP2022/053750

§ 371 (c)(1),
(2) Date: Aug. 14, 2023

(87) PCT Pub. No.: WO2022/175299

PCT Pub. Date: Aug. 25, 2022

(65) Prior Publication Data

US 2024/0145200 A1 May 2, 2024

(30) Foreign Application Priority Data

Feb. 16, 2021 (DE) ..................... 10 2021 103 542.2

(51) Int. Cl.
*H01H 71/24* (2006.01)
*H01H 50/36* (2006.01)
*H01H 51/22* (2006.01)

(52) U.S. Cl.
CPC ........ *H01H 71/2454* (2013.01); *H01H 50/36* (2013.01); *H01H 51/2209* (2013.01)

(58) Field of Classification Search
None
See application file for complete search history.

(56) References Cited

U.S. PATENT DOCUMENTS 3,396,351 A 8/1968 Callender
3,914,725 A * 10/1975 Williamson ......... H01H 51/086 335/123
2013/0115807 A1 5/2013 Enomoto et al.

FOREIGN PATENT DOCUMENTS

CN 1065357 A 5/2001
CN 101390180 A 3/2009
(Continued)

OTHER PUBLICATIONS

Taiwanese Search Report dated Aug. 9, 2022 in related Taiwan Application No. 111105681 (ten pages).
(Continued)

*Primary Examiner* — Bernard Rojas
(74) *Attorney, Agent, or Firm* — DENTONS Durham Jones Pinegar

(57) ABSTRACT

Disclosed is a switching device having an electromagnetic actuation device for driving a movable contact, which actuation device has an excitation coil for generating a magnetic field, a magnetic yoke for amplifying the flux density of the magnetic field, and a magnet armature which can be pulled from a starting position to a pulled position by the magnetic field and which is connected to the movable contact. The actuation device includes a locking element which at least partly consists of a ferromagnetic material and is arranged such that by virtue of the effect of the magnetic field, the locking element is brought from the unlocking position to the locking position. The magnetic yoke is designed to have a discontinuity when the locking element is in the locking position, and the discontinuity of the magnetic yoke is closed by the locking element when the locking element is in the unlocking position.

13 Claims, 5 Drawing Sheets

(56) References Cited

FOREIGN PATENT DOCUMENTS

Figure 1:
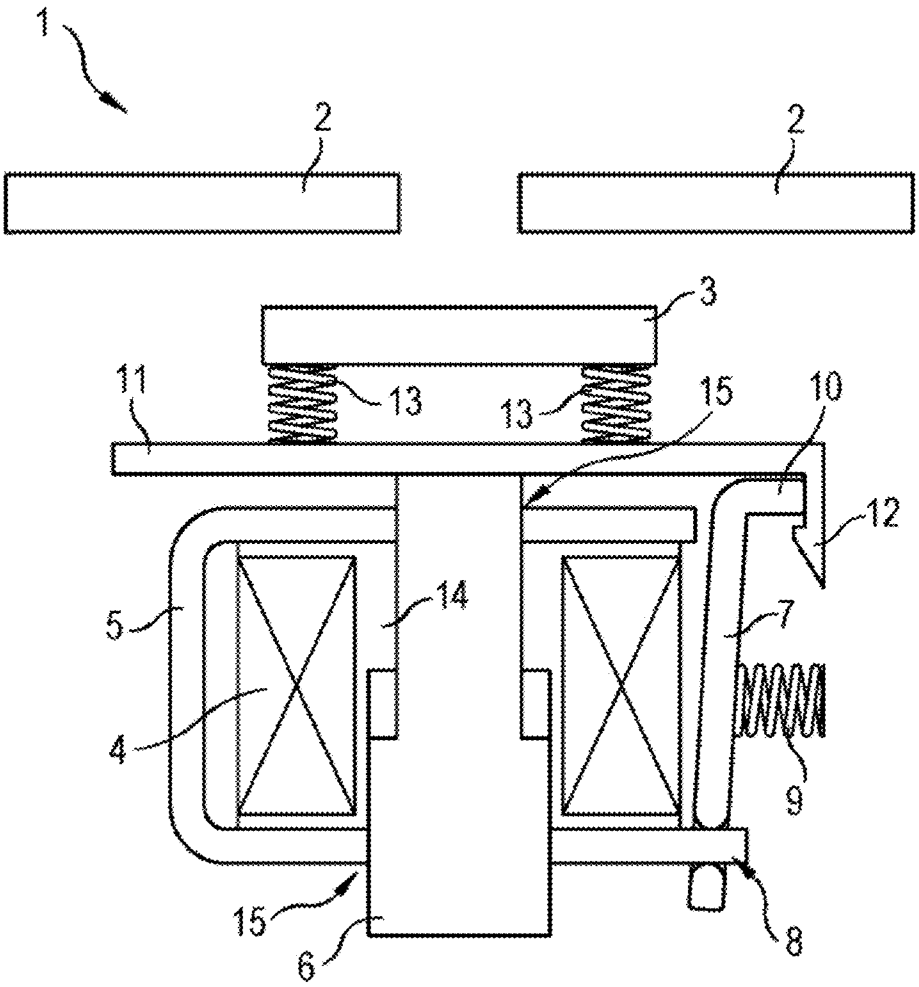

| | | | | |
|---|---|---|---|---|
| CN | 102668005 | A | 9/2012 | |
| CN | 107785214 | A | 3/2018 | |
| DE | 196 25 657 | A1 | 1/1998 | |
| DE | 299 03 873 | U1 | 6/1999 | |
| DE | 697 10 134 | T2 | 7/2002 | |
| DE | 10 2014 211 735 | A1 | 12/2015 | |
| GB | 818 172 | A | 8/1959 | |
| WO | WO-2010142212 | A1 * | 12/2010 | ............. H01H 51/08 |
| WO | 2012/033262 | A1 | 3/2012 | |
| WO | 2017/002350 | A1 | 1/2017 | |

OTHER PUBLICATIONS

German Search Report dated Apr. 22, 2021 in related German application No. 10 2021 103 542.2 (five pages).
International Search Report dated May 9, 2022 in related PCT/EP2022/053750 (six pages).
Hearing Notice dated Mar. 10, 2025 in related India Application No. 202347056789; two pages.

* cited by examiner

ELECTRICAL SWITCHING DEVICE WITH LOCKING FUNCTION

This application is a U.S. National Phase Application of PCT/EP2022/053750, filed Feb. 16, 2022, which claims the priority of German Patent Application 10 2021 103 542.2, filed Feb. 16, 2021, the entireties of which are incorporated by reference herein.

The present invention relates to a switching device according to the preamble of independent claim 1.

A generic switching device has at least one stationary contact and a movable contact cooperating therewith. Further, the generic switching device includes an electromagnetic actuation device for driving the movable contact, the electromagnetic actuation device having an excitation coil for generating a magnetic field, a magnetic yoke for amplifying the flux density of the magnetic field, and a magnet armature that is configured to be pulled by the magnetic field from a starting position to a pulled position and is connected to the movable contact. The electromagnetic actuation device further includes a locking element transferable from a locking position, in which the locking element prevents movement of the magnet armature and/or the movable contact, to an unlocking position, in which the locking element releases movement of the magnet armature and/or the movable contact. The locking element is at least partially made of a ferromagnetic material and is arranged to be moved from the unlocking position to the locking position by virtue of the effect of the magnetic field of the drive.

Typically, conventional electromagnetically actuated switching devices have at least one stationary contact and one movable contact, the movable contact being moved to the stationary contact by a magnet armature when the excitation coil of the electromagnetic actuation device of the switching device is energized. If the switching device is used in vehicle construction, there is a risk, for example in the event of an accident, that such large forces occur that the contacts are inadvertently closed without activating the electromagnetic actuation device. Accidental closing of the contacts must be reliably prevented. This may be achieved, for example, by using a very strong return spring that preloads the magnet armature to its starting position. The disadvantage of this solution is that the electromagnetic actuation device must be suitably powerful to overcome the large spring force of the return spring.

To address this problem, DE 10 2014 211 735 A1 proposes locking the magnet armature in the starting position. For example, a ferromagnetic ball may be used as a locking element, which is accommodated in corresponding recesses of the magnet armature and the magnetic yoke of the excitation coil and generates a positive lock between the magnet armature and the magnetic yoke in a locking position. When the excitation coil is energized, the magnetic flux generated thereby pulls the ferromagnetic ball out of the recess of the armature and slightly further into the recess of the magnetic yoke, so that the movement of the magnet armature is released. Document DE 10 2014 211 735 A1 thus discloses a switching device according to the preamble of independent claim 1.

It is the object of the present invention to further improve the generic switching device. The switching device according to the invention is to be particularly simple in construction and cost-efficient to manufacture and to ensure reliable unlocking.

The problem is solved by the features of independent claim 1. Accordingly, there is a solution to the problem according to the invention, if the magnetic yoke is configured in such a way that the magnetic yoke has a discontinuity when the locking element is in the locking position, the discontinuity of the magnetic yoke being closed by the locking element when the locking element is in the unlocking position.

According to the invention, the locking element is thus part of the magnetic yoke. The magnetic flux acting on the magnet armature is amplified when the magnetic yoke is closed. This is advantageous in that the magnet armature and/or the moving contact may be unlocked reliably and without the risk of jamming the magnet armature, since initially no great forces are exerted on the magnet armature. Only when the magnet armature and/or the movable contact has been unlocked and the magnetic yoke has been closed by the ferromagnetic locking element, the magnetic flux acting on the magnet armature is increased so that the full tightening force is applied.

Advantageous embodiments of the present invention are the subject-matter of the dependent claims.

According to a particularly preferred embodiment of the present invention, the electromagnetic actuation device is configured to pull the magnet armature against the force of a return spring of the electromagnetic actuation device when the magnetic yoke is closed, whereas the magnetic flux acting on the magnet armature is insufficient to pull the magnet armature against the force of the return spring when the magnetic yoke is interrupted.

According to another particularly preferred embodiment of the present invention, the locking element is configured in the manner of a swivel armature. This embodiment provides a particularly simple and at the same time reliable configuration.

According to a further preferred embodiment of the present invention, the locking element is biased into the locking position by a resetting element, preferably in the form of a pretensioning spring. As a result, the locking element is held securely in the locking position. Thus, the magnet armature is also securely locked, preferably in its starting position. The resetting element may preferably be implemented in the form of a tension spring or in the form of a compression spring.

According to another particularly preferred embodiment of the present invention, a direction of movement of the locking element extends transversely to a direction of movement of the magnet armature and preferably encloses an angle of at least 70° to ideally 90° with respect to the direction of movement of the magnet armature. This ensures that a force occurring, for example, in the event of an accident and acting in the direction of movement of the magnet armature has no effect or virtually no effect on the locking element. If the locking element is configured as a swivel armature, the direction of movement of the locking element is to be understood as the direction of movement—possibly changing along the path of movement—of the pivoted end of the locking element, which may move along a circular path, for example, if the swivel armature is rotatably coupled to the magnetic yoke.

According to a further preferred embodiment of the present invention, the magnet armature is configured as a tie rod extending through the excitation coil. This results in a particularly simple and compact configuration.

According to another preferred embodiment of the present invention, the magnetic yoke has a U-shaped section enclosing the excitation coil, wherein the locking element is arranged on the open side of the U-shaped section in such a way that the U-shaped section is completed by the locking element to form a closed yoke when the locking element is in the unlocking position. This embodiment also contributes to a particularly simple configuration.

According to another preferred embodiment of the present invention, the magnetic yoke includes an upper yoke plate and a lower yoke plate arranged parallel and spaced apart from each other and substantially perpendicular to the magnet armature and between which the excitation coil is arranged, wherein the locking element is arranged on the two yoke plates in such a way that the two yoke plates are completed into a U-shaped section when the locking element is in the unlocking position. Thus, in this embodiment, the magnetic yoke is formed by the two yoke plates and the locking element. In the locking position of the locking element, the discontinuity of the magnetic yoke is formed by an air gap between the locking element and one of the two yoke plates. In the unlocking position of the locking element, the discontinuity is closed, the locking element is in contact with both yoke plates and the magnetic yoke is closed in a U-shape. This provides a simple and light configuration of the magnetic yoke.

Advantageously, it is also an option that the locking element has a projection that interacts with a back taper formed on the magnet armature or on the movable contact in order to lock or release the magnet armature and/or the movable contact. This ensures simple and secure locking or unlocking of the magnet armature or the moving contact.

It is also an option that the protrusion is formed on the magnet armature or the movable contact and the back taper is formed on the locking element.

According to yet another preferred embodiment, the projection of the locking element is provided in the form of a protruding nose that cooperates with the back taper provided in the form of a hook for locking the magnet armature and/or the movable contact, the hook being formed on the magnet armature or the movable contact or being connected to the magnet armature or the movable contact, respectively. The hook is preferably formed such that the nose automatically re-engages with the hook when the armature moves from the pulled position to the starting position. The hook is preferably formed on a component rigidly connected to the armature, for example on a contact carrier connected to the armature. However, the hook may also be formed on the movable contact, for example, which may not be rigidly connected to the contact carrier but may be connected to it via one or more contact pressure springs. In this case, the movable contact is primarily prevented from moving by the locking element. The magnet armature is also prevented from moving by the locking element, but only after the spring stroke of the contact pressure spring(s) has been utilized. Instead of a protruding nose, the locking element may alternatively have a corresponding recess that engages with the hook.

Advantageously, it is also an option that the projection in the locking element is in the form of an elongated hole extending essentially perpendicular to the magnet armature, the magnet armature extending through the elongated hole and the magnet armature having an annular groove that forms the back taper and interacts with the elongated hole in the locking element to lock or unlock the magnet armature. This also ensures simple and secure locking and unlocking of the magnet armature.

The locking element is preferably made in one piece and preferably consists entirely of a ferromagnetic material. However, optionally, it may be made of several parts. For example, the locking element may have a ferromagnetic part that completes the magnetic yoke in the unlocking position, as well as a part attached to it, which is responsible for the actual locking. In particular, the locking element may include an activating part and a locking part, wherein the locking part and the activating part are hingedly connected to each other.

In still another embodiment the activating part and the locking part form an angle of 80° to 100° with each other, wherein the locking part is arranged substantially parallel to the two yoke plates and the elongated hole is formed in the locking part. This also enables a simple and stable design.

Further preferably, it is provided that the locking element locks the magnet armature in the starting position when it is in the locking position. Thereby, further preferably, the at least one stationary contact and the at least one movable contact cooperating therewith are open when the magnet armature is in the starting position.

The switching device is preferably a contactor.

An embodiment of the present invention is explained in more detail below with reference to drawings.

Figure 2:
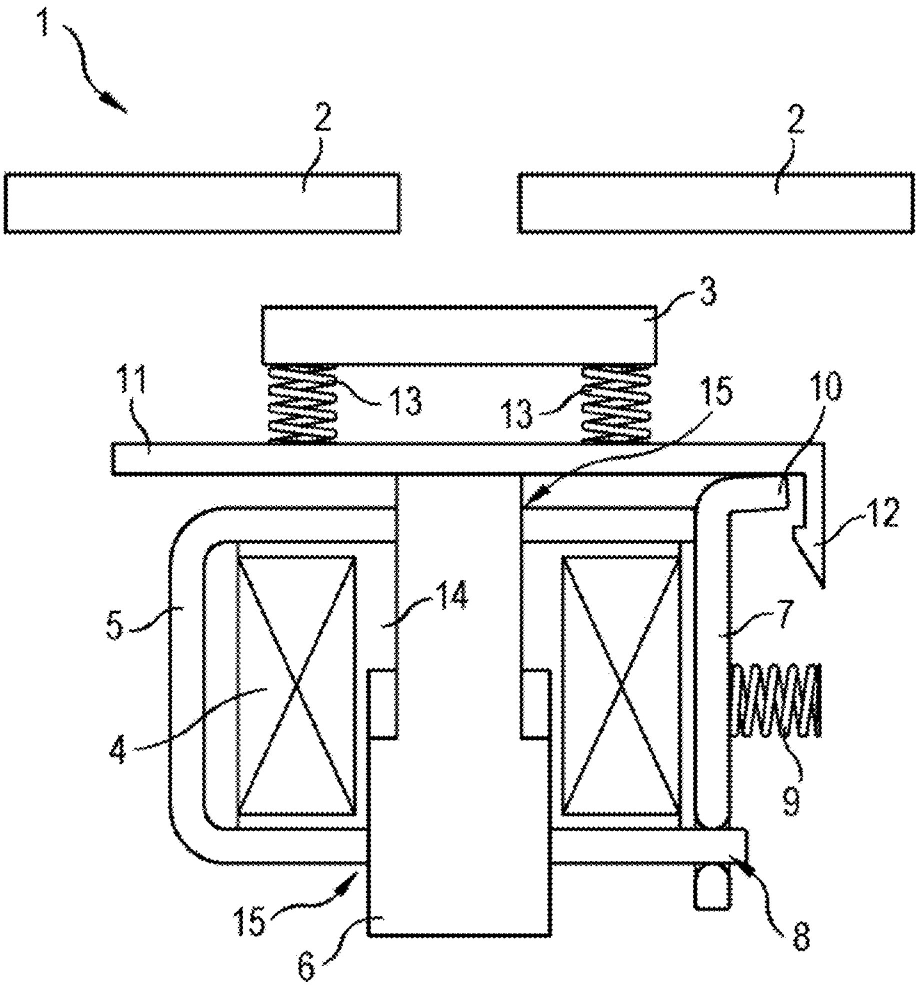
Figure 3:
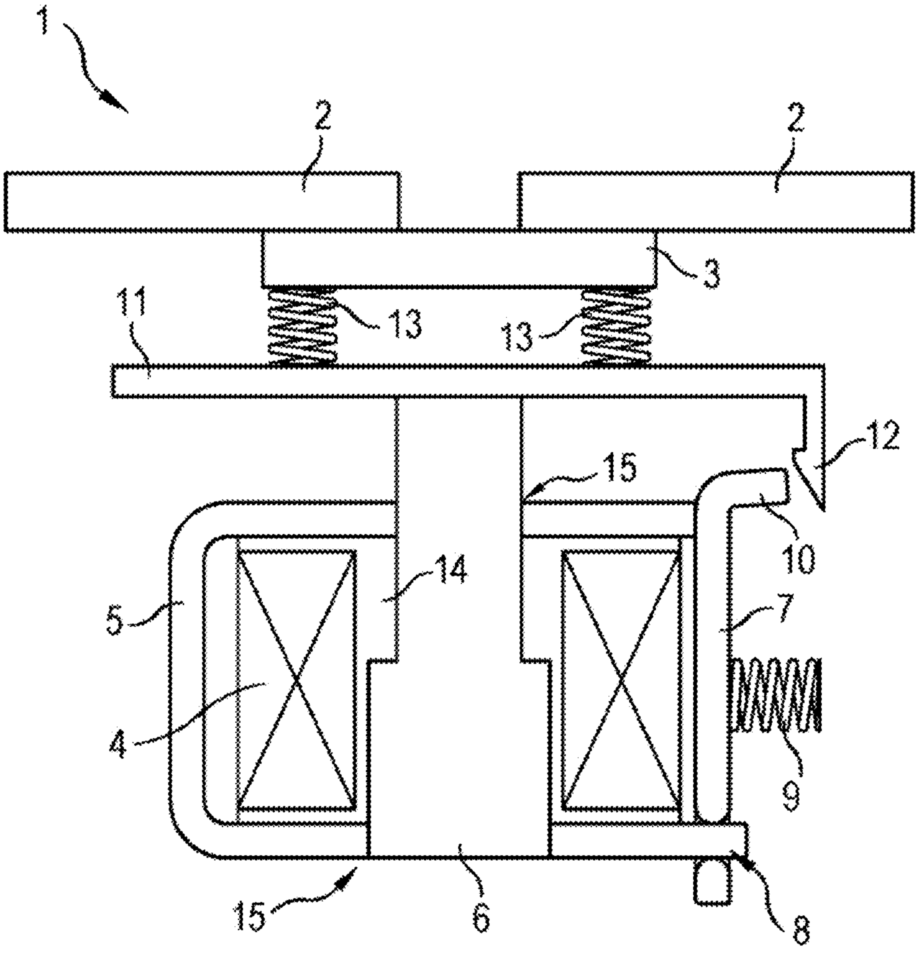
Figure 4:
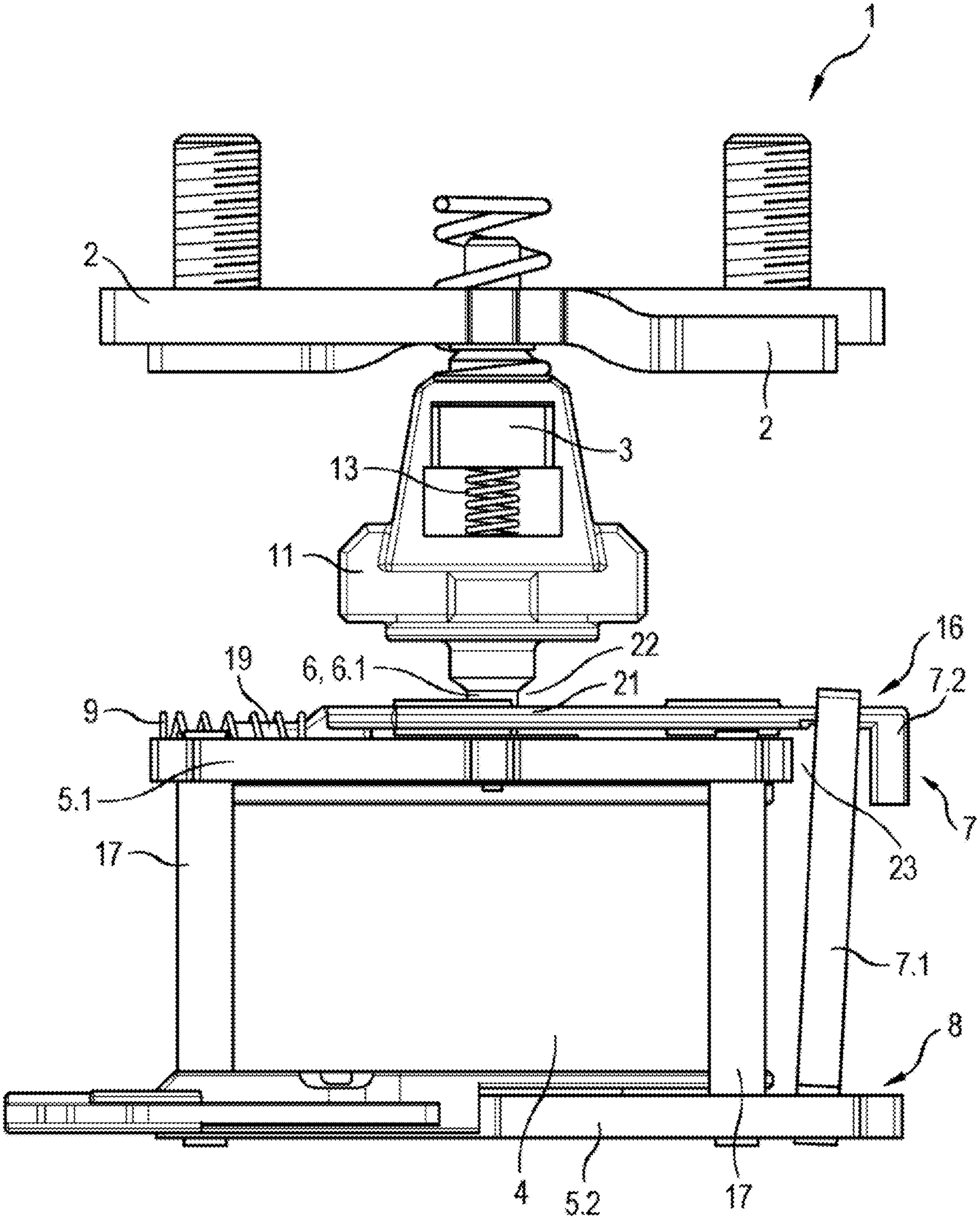
Figure 5:
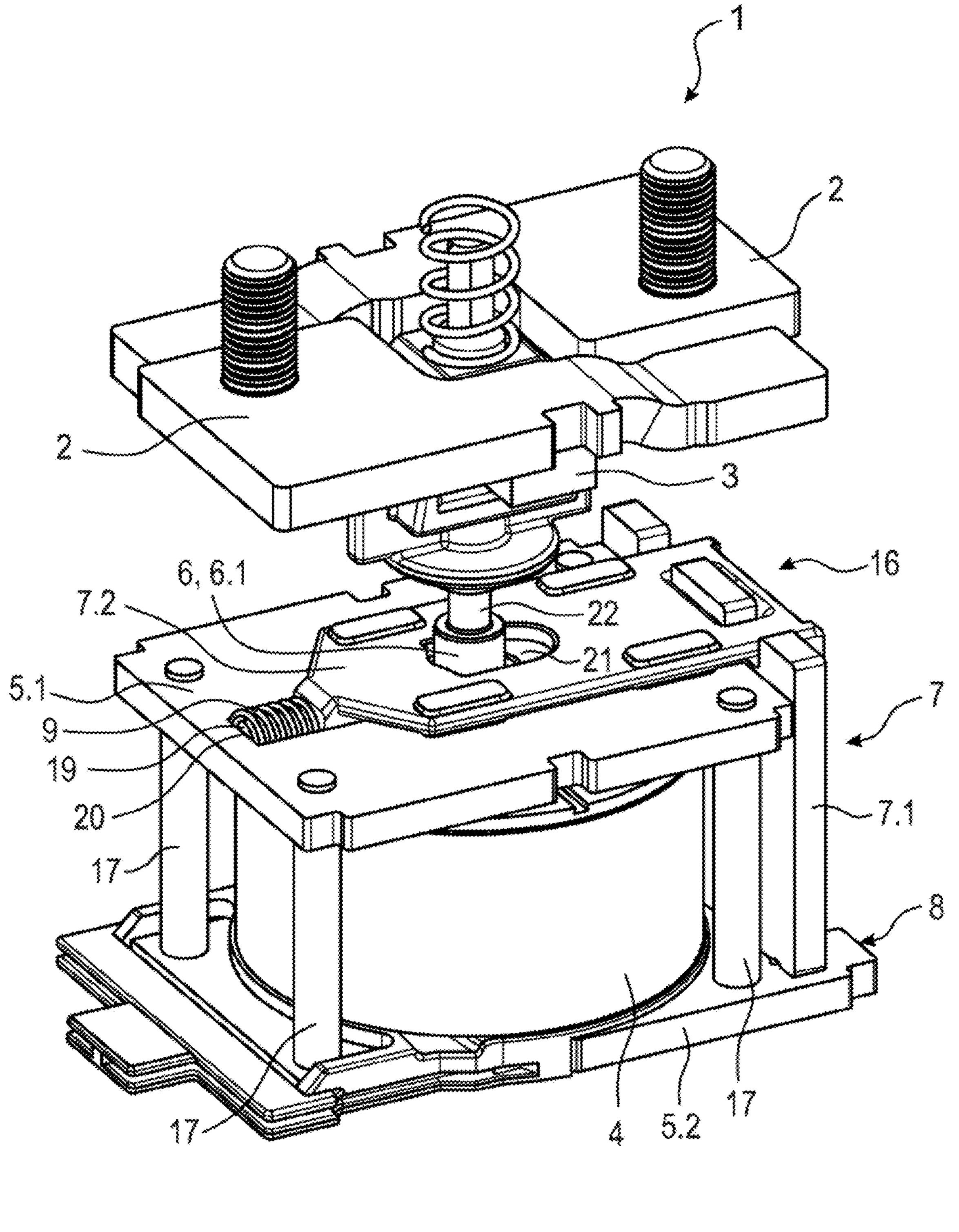

In the drawings:

FIG. 1: shows a schematic section through a switching device according to the invention with the magnet armature in the starting position and the locking element in the locking position, FIG. 2: shows the switching device according to the invention as shown in FIG. 1 with the magnet armature still in the starting position and the locking element in the unlocking position, FIG. 3: illustrates the switching device according to the invention from FIGS. 1 and 2 after unlocking the magnet armature with the magnet armature in the pulled position, FIG. 4: is side view of a second embodiment of a switching device according to the invention with the magnet armature in the starting position and the locking element in the locking position, and FIG. 5: is a perspective view of the switching device of FIG. 4 after unlocking the magnet armature with the magnet armature in the pulled position.

For the following embodiments, identical parts are indicated by identical reference signs. If a figure contains reference signs that are not described in detail in the associated figure description, reference is made to previous or subsequent figure descriptions.

FIG. 1 shows a schematic section through a switching device 1 according to the invention. The switching device 1 has two stationary contacts 2 and a movable contact in the form of a contact bridge 3. In the illustration of FIG. 1, the electrical contacts are open.

The switching device 1 also has an electromagnetic actuation device for driving the movable contact 3. The electromagnetic actuation device has an excitation coil 4 for generating a magnetic field that acts on a magnet armature 6 configured as a tie rod. The excitation coil 4 is wound on a bobbin 14. The tie rod 6 is connected at its upper end to a contact carrier 11, which in turn is connected to the contact bridge via corresponding contact pressure springs 13.

The electromagnetic actuation device further has a magnetic yoke for amplifying the magnetic flux acting on the armature 6. The magnetic yoke has a U-shaped section 5 surrounding the excitation coil on three sides. The two legs of the U-shaped section 5 cover the two end faces of the hollow cylindrical bobbin 14. The two legs have corresponding bores 15, through which the magnet armature 6 extends. At the open end of the U-shaped section, a likewise ferromagnetic locking element 7 is hinged to the lower leg of the U-shaped section. The locking element 7 is designed in the manner of a swivel armature and is arranged on the U-shaped section 5 of the magnetic yoke so that it may be pivoted via the joint 8.

In the starting position of the magnet armature 6 shown in FIG. 1, the locking element 7 is initially in a locking position when the excitation coil is switched off. For this purpose, the locking element 7 has an outwardly projecting nose 10 at the free end, which is latched with a hook 12 projecting from the contact carrier 11. Upon switching off the actuation device the locking element 7 is reliably held in the locking position by a pretensioning spring 9, which in the example shown is configured as a tension spring and is fastened to a housing element not shown herein.

Upon energizing the excitation coil 4, the locking element 7, which is configured as a swivel armature, is attracted by the U-shaped section 5 of the magnetic yoke due to the magnetic flux, so that the free end of the locking element 7 moves towards the free end of the upper leg of the U-shaped section 5. The hook 12 is thereby released, unlocking the magnet armature. The locking element 7 is now in an unlocking position. At the same time, the locking element 7 thereby closes the magnetic yoke of the excitation coil (FIG. 2), so that the magnetic flux acting on the magnet armature is increased and the magnet armature is moved from the starting position to the pulled position (FIG. 3) against the force of a return spring (not shown), so that the electrical contacts are closed.

FIG. 4 shows a side view of a further embodiment of a switching device 1 according to the invention in the locking position of the locking element 7. In this position, the contact points of the switching device 1 are open (OFF position). The structure of the switching device 1 according to the second embodiment essentially corresponds to the structure of the switching device shown in FIGS. 1 to 3. Therefore, only the differences will be referred to in the following. For elements of the switching device 1 according to the second embodiment that are not described, reference is made to the preceding description of FIGS. 1 to 3.

According to the embodiment shown in FIG. 4, the magnetic yoke includes two yoke plates, an upper yoke plate 5.1 and a lower yoke plate 5.2. The two yoke plates 5.1, 5.2 are arranged parallel to each other. Bolts 17 extending perpendicular to the yoke plates 5.1, 5.2 are arranged between the two yoke plates 5.1, 5.2 and hold the yoke plates 5.1, 5.1 at a distance from each other. The bolts 17 are connected to the two yoke plates 5.1, 5.2. The bolts 17 are preferably made of a non-magnetic steel or plastic. Tests have shown that bolts made of magnetic materials also show good results. The two yoke plates 5.1, 5.2 extend essentially perpendicular to the longitudinal axis of the magnet armature 6. The excitation coil 4 is arranged between the two yoke plates 5.1, 5.2.

The locking element 7 is formed in two parts and includes an activating part 7.1 and a locking part 7.2. The activating part 7.1 is preferably formed from a ferromagnetic material and is also part of the magnetic yoke. Furthermore, the activating part 7.1 is configured in the manner of a swivel armature and is pivotably connected to the lower yoke plate 5.2 of the magnetic yoke via a first joint 8, i.e. it is connected the yoke plate 5.2 facing away from the contact points. The locking part 7.2 is pivotably connected to the activating part 7.1 via a second joint 16. The locking part 7.2 is configured in the form of a slide. The locking part 7.2 extends approximately at right angles to the activating part 7.1. Depending on the position of the activating part 7.1, the locking part 7.2 therefore forms an angle of approximately 80° to 100°, preferably approximately 85° to 95°, with the activating part 7.1. The locking part 7.2 extends essentially parallel to the upper yoke plate 5.1 of the magnetic yoke, i.e. the yoke plate facing the contact points. The locking part 7.2 thus extends essentially at right angles to the direction of movement of the magnet armature 6.

The locking part 7.2 may be guided on the upper yoke plate 5.1. Furthermore, the locking part 7.2 has a pin 19 extending in the longitudinal direction of the locking part 7.2. Starting from the end face of the locking part 7.2 facing away from the activating part 7.1, the pin 19 extends in the longitudinal direction of the locking part 7.2 in extension of the locking part 7.2. The upper yoke plate 5.1 has a groove (see FIG. 5) that extends essentially perpendicular to the direction of movement of the magnet armature 6 in the upper yoke plate 5.1. The pin 19 of the locking part 7.2 is guided in the groove 20 of the upper yoke plate 5.1. A pretensioning spring 9 is arranged between the pin 19 of the locking part 7.2 and the opposite end of the groove 20 in the upper yoke plate 5.1. One end of the pretensioning spring 9 is attached to the pin 19, the other end of the pretensioning spring is attached to the locking part 7.2. The locking part 7.2 is movable relative to the magnet armature 6 parallel to the yoke plates 5.1, 5.2.

Furthermore, the locking part 7.2 has an elongated hole 21 that extends in the longitudinal direction of the locking part 7.2. The elongated hole 21 is clearly visible in FIG. 5. The magnet armature 6 has an anchor rod 6.1 that, starting from a part of the magnet armature 6 arranged in the excitation coil 4, extends upwards to the contact carrier 11. The anchor rod 6.1 of the magnet armature 6 is essentially cylindrical and passes through the elongated hole 21 of the locking part 7.2. In the region, in which the anchor rod 6.1 passes through the elongated hole 21 of the locking part 7.2, the anchor rod 6.1 has an annular groove 22. In the vicinity of the annular groove 22, the diameter of the anchor rod 6.1 is thus smaller than in portions of the anchor rod 6.1 above and below the locking part 7.2. The width of the annular groove 22 in the anchor rod 6.1 is slightly larger than the thickness of the locking part 7.2. The width of the elongated hole 21 in the locking part 7.2 is slightly larger than the diameter of the anchor rod 6.1 of the magnet armature 6 below the annular groove 21. The magnet armature 6 or the anchor rod 6.1 are therefore able to move up and down perpendicular to the locking part 7.2 through the elongated hole 21 in the locking part 7.2 when the locking part 7.2 is not engaged with the annular groove 22 in the anchor rod 6.1.

In FIG. 4, the switching device 1 is shown in the locking position. Here, the activating part 7.1 is pivoted outward about the joint 8, i.e. away from the excitation coil 4, so that an air gap 23 is formed between the upper yoke plate 5.1 of the magnetic yoke and the upper end of the activating part 7.1. This air gap 23 forms the discontinuity of the magnetic yoke in the locking position. Thus, the locking part 7.2 is pulled outward, that is, to the right in FIG. 4, so that one end of the elongated hole 21 in the locking part 7.2 abuts the bottom of the annular groove 22 in the anchor rod 6.1 of the magnet armature 6. The locking part 7.2 thus engages in the annular groove 22 of the anchor rod 6.1 of the magnet armature 6 and locks the magnet armature 6 in the axial direction. The magnet armature 6 can thus be moved neither up nor down and the contact points of the switching device 1 are locked in the open position. In order to reliably hold the locking element 7, i.e. in particular the locking part 7.2, in the locking position when the actuation device is switched off, the pretensioning spring 9 is provided. As already described, the pretensioning spring 19 is inserted into the groove 20 in the upper yoke plate 5.1 of the magnetic yoke and is attached to the yoke plate 5.1 and to the locking part 7.2 and presses the locking part 7.2 into the locking position.

FIG. 5 shows the second embodiment of the switching device 1 of FIG. 4 after unlocking the magnet armature with the magnet armature in the pulled position. In this position, the contact points of the switching device 1 are closed (ON position).

For unlocking the magnet armature 6 the excitation coil 4 is energized. As a result, the activating part 7.1 of the locking element 7, which is designed as a swivel armature, is attracted by the two yoke plates 5.1, 5.2 due to the magnetic flux. The free upper end of the activating part 7.1 is moved towards the free end of the upper yoke plate 5.1 and the air gap 23, and thus also the magnetic yoke is closed. At the same time, the locking part 7.2 is also moved essentially perpendicular to the direction of movement of the magnet armature 6. The end of the elongated hole 21 of the locking part 7.2 is pushed out of the annular groove 22 of the anchor rod 6.1 of the magnet armature 6. The locking part 7.2 is now in an unlocking position. This releases or unlocks the magnet armature 6. The magnet armature or the anchor rod 6.1 can move up and down through the elongated hole 21 in the locking part 7.2.

As described, the air gap 23 is closed at the same time. The activating part 7.1 thus then closes the magnetic yoke of the excitation coil 4. In this second embodiment, the magnetic yoke is formed by the two yoke plates 5.1, 5.2 and the locking element, or in particular the activating part 7.1 of the locking element 7. As a result, the magnetic flux acting on the magnet armature 6 is amplified and the magnet armature 6 is moved from the starting position to a pulled position against the force of a return spring not shown. As a result, the contact carrier 11 with the contact bridge 3 arranged thereon is moved in the direction of the stationary contacts 2 and the electrical contacts are closed.

LIST OF REFERENCE SIGNS

1 Switching device
2 Stationary contact
3 Contact bridge (movable contact)
4 Excitation coil
5 U-shaped section of the magnetic yoke
5.1 Upper yoke plate
5.2 Lower yoke plate
6 Magnet armature
6.1 Anchor rod
7 Locking element
7.1 Activating part
7.2 Locking part
8 Joint
9 Pretensioning spring
10 Nose
11 Contact carrier
12 Hook
13 Contact pressure spring
14 Bobbin
15 Hole
16 Second joint
17 Bolt
19 Pin
20 Groove
21 Elongated hole
22 Annular groove
23 Air gap

The invention claimed is:

1. A switching device comprising at least one stationary contact and a movable contact cooperating therewith, and comprising an electromagnetic actuation device for driving the movable contact, wherein the electromagnetic actuation device comprises an excitation coil for generating a magnetic field, a magnetic yoke for amplifying the flux density of the magnetic field, and a magnet armature configured to be pulled by the magnetic field from a starting position to a pulled position and connected to the movable contact, wherein the electromagnetic actuation device further comprises a locking element movable from a locking position, in which the locking element prevents movement of the magnet armature and/or the movable contact, into an unlocking position, in which the locking element releases a movement of the magnet armature and/or of the movable contact, wherein the locking element consists at least partially of a ferromagnetic material and is configured so as to be transferred from the unlocking position into the locking position due to the action of the magnetic field, wherein the magnetic yoke is configured such that the magnetic yoke has a discontinuity when the locking element is in the locking position, the discontinuity of the magnetic yoke being closed by the locking element when the locking element is in the unlocking position, and wherein the magnetic yoke comprises an upper yoke plate and a lower yoke plate that are arranged parallel to and spaced apart from one another and substantially perpendicular to the magnet armature and between which the excitation coil is arranged, the locking element being arranged on the two yoke plates such that the two yoke plates are completed to form a U-shaped section when the locking element is in the unlocking position.

2. The switching device according to claim 1, wherein the electromagnetic actuation device is configured to amplify the magnetic flux acting on the magnet armature when the discontinuity of the magnetic yoke is closed by the locking element.

3. The switching device according to claim 2, wherein the electromagnetic actuation device is configured to pull the magnet armature against the force of a return spring of the electromagnetic actuation device when the magnetic yoke is closed, whereas the magnetic flux acting on the magnet armature is insufficient to pull the magnet armature against the force of the return spring when the magnetic yoke is interrupted.

4. The switching device according to claim 1, wherein the locking element is configured in the manner of a swivel armature.

5. The switching device according to claim 1, wherein the locking element is biased into the locking position by a resetting element, preferably in the form of a pretensioning spring.

6. The switching device according to claim 1, wherein a direction of movement of the locking element extends transversely to a direction of movement of the magnet armature.

7. The switching device according to claim 6, wherein the direction of movement of the locking element forms an angle of 70° to 90° with the direction of movement of the magnet armature.

8. The switching device according to claim 1, wherein the locking element has a projection that cooperates with a back taper formed on the magnet armature or on the movable contact to lock or release the magnet armature and/or the movable contact.

9. The switching device according to claim 8, wherein the projection in the locking element is configured in the form of an elongated hole extending essentially perpendicular to the magnet armature, the magnet armature extending through the elongated hole and the magnet armature having an annular groove that forms the back taper and cooperates with the elongated hole in the locking element for locking or unlocking the magnet armature.

10. The switching device according to claim 1, wherein the locking element is formed in several parts and has an activating part and a locking part, the locking part and the activating part being hingedly connected to one another.

11. The switching device according to claim 10, wherein the activating part and the locking part form an angle of 80° to 100° with one another, the locking part being arranged essentially parallel to the two yoke plates and an elongated hole being formed in the locking part.

12. The switching device according to claim 1, wherein the locking element in its locking position locks the magnet armature in the starting position.

13. The switching device according to claim 10, wherein the at least one stationary contact and the movable contact cooperating therewith are open when the magnet armature is in the starting position.

* * * * *